(12) United States Patent
Vellolil et al.

(10) Patent No.: US 7,293,207 B2
(45) Date of Patent: Nov. 6, 2007

(54) METHOD FOR TESTING MEMORY IN A COMPUTER SYSTEM UTILIZING A CPU WITH EITHER 32-BIT OR 36-BIT MEMORY ADDRESSING

(75) Inventors: Sasi Vellolil, Liburn, GA (US); Ashraf Javeed, Norcross, GA (US); Jerry Lynn Petree, Jr., Alpharetta, GA (US); Stefano Righi, Lawrenceville, GA (US)

(73) Assignee: American Megatrends, Inc, Norcross, GA (US)

( * ) Notice: Subject to any disclaimer, the term of this patent is extended or adjusted under 35 U.S.C. 154(b) by 662 days.

(21) Appl. No.: 10/263,391

(22) Filed: Oct. 2, 2002

(65) Prior Publication Data

US 2004/0068679 A1    Apr. 8, 2004

(51) Int. Cl.
*G11C 29/18* (2006.01)
*G11C 29/40* (2006.01)

(52) U.S. Cl. .................... 714/718; 714/702

(58) Field of Classification Search ............ 714/718, 714/763, 743, 25, 30, 42, 54; 365/200, 201
See application file for complete search history.

(56) References Cited

U.S. PATENT DOCUMENTS

| | | | | | |
|---|---|---|---|---|---|
| 5,072,137 A | * | 12/1991 | Slemmer | ................ | 326/16 |
| 5,588,125 A | * | 12/1996 | Bennett | ................ | 710/306 |
| 5,644,581 A | * | 7/1997 | Wu | ................ | 714/738 |
| 5,912,852 A | * | 6/1999 | Lawrence et al. | ................ | 365/201 |
| 6,738,882 B1 | * | 5/2004 | Gau | ................ | 711/170 |
| 2003/0105858 A1 | * | 6/2003 | Hogg et al. | ................ | 709/224 |
| 2003/0221145 A1 | * | 11/2003 | Stong et al. | ................ | 714/718 |

OTHER PUBLICATIONS

IA-32 Intel® Architecture Software Developer's Manual, vol. 1: Basic Architecture, Order No. 245470-007, 2002 Intel Corporation.
IA-32 Intel® Architecture Software Developer's Manual, vol. 2: Instruction Set Reference, Order No. 245471-007, 2002 Intel Corporation.
IA-32 Intel® Architecture Software Developer's Manual, vol. 3: System Programming Guide, Order No. 245472-007, 2002 Intel Corporation.

* cited by examiner

*Primary Examiner*—Cynthia Britt
*Assistant Examiner*—Dipakkumar Gandhi
(74) *Attorney, Agent, or Firm*—Hope Baldauff Hartman, LLC

(57) ABSTRACT

A method is provided for testing the entire memory address range of memory in a computer system having a Cpu supporting 32-bit or 36-bit memory addressing. If the CPU supports 36-bit addressing a page directory is created containing entries that support accessing the memory according to a maximum page size supported by the processor. If the processor supports 32-bit memory addressing, a page directory and one or more page tables are created for accessing the memory according to a maximum page size supported by the processor. Once the page directory and page tables have been created, they are utilized to access and test a portion of the memory. The page directory and page tables are then dynamically modified to allow access to other portions of the memory.

20 Claims, 12 Drawing Sheets

METHOD FOR TESTING MEMORY IN A COMPUTER SYSTEM UTILIZING A CPU WITH EITHER 32-BIT OR 36-BIT MEMORY ADDRESSING

TECHNICAL FIELD

Embodiments of the invention generally relate to the field of computer diagnostic software and, more particularly, to the field of testing computer memory.

BACKGROUND OF THE INVENTION

The desktop and server computer systems of today are extremely complex computing devices. These types of systems typically come equipped with high-performance central processing units ("CPUs" or "processors") operating at clock speeds in excess of one gigahertz. These systems also come equipped with random access memory ("RAM") typically of 256 megabytes or more and, in the case of server computers, potentially exceeding four gigabytes ("GB"). These computers also include many subsystems, such as mass storage devices, network devices, input/output devices, and others. In order to ensure that the CPU, RAM, and other subsystems of such a computer system are operating correctly, it is often necessary to execute a diagnostics application program on the computer to test the various subsystems.

Diagnostics application programs exist today that can test each of the various subsystems of a computer system and report any errors encountered. As an example, many diagnostics application programs include modules for testing the memory subsystems, including the RAM, of computer systems. Memory testing modules such as these typically write a bit pattern to each location in the RAM and then read the pattern back. If the pattern read is the same as the pattern written, the RAM is operating correctly. If the pattern read is different than the pattern written, however, a problem may exist with the RAM. Other types of pattern tests may also be performed.

Although memory testing modules utilized by current diagnostics applications program are capable of adequately performing RAM memory tests, these modules are not without their drawbacks. One such drawback is caused by differences in the memory addressing architecture of the current breed of CPUs utilized in most desktop and server computers. In particular, one class of CPU utilizes 36-bits to address main memory. By using 36-bits, this class of processor is capable of addressing up to 64 GB of memory. Processors of this type include the PENTIUM class of processors made by the INTEL CORPORATION and the ATHLON class of processors made by ADVANCED MICRO DEVICES.

Another class of CPU devices utilize 32-bits to address main memory. By using 32-bits, this class of processor is capable of addressing up to four GB of memory. Processors of this type include the C3 and CYRIX processors from VIA TECHNOLOGIES, INC. Because processors using 32-bit and 36-bit addressing are generally instruction compatible, these CPU devices are used variously in many of today's desktop and server computers. However, although CPUs using 32-bit and 36-bit memory addressing are typically instruction compatible, the differences in the memory addressing architectures of these processors generally prevents a single memory testing module from testing the memory of a computer system having a CPU with 32-bit addressing and a computer system having a processor with 36-bit addressing.

In order to test memory addressed by both types of CPUs, current diagnostics application programs utilize two different memory testing modules. One memory testing module is configured to test the memory of a computer system having a CPU with 32-bit addressing and another memory testing module is configured to test the memory of a computer system having a CPU with 36-bit addressing. However, maintaining separate memory testing modules for 32-bit and 36-bit processors takes more storage space than a single module, requires additional programmer time to maintain two modules, and increases the chances that a programming error may be introduced that would prevent a memory failure from being detected.

Therefore, in light of the above, there is a need for a unified method for testing computer memory that can test memory in computer systems utilizing CPUs having 32-bit memory addressing and memory in computer systems utilizing CPUs having 36-bit memory addressing.

SUMMARY OF THE INVENTION

Embodiments of the present invention solved the above-described problems by providing a method for testing computer memory that can test the entire memory address range of memory in a computer system having a CPU supporting 32-bit or 36-bit memory addressing. According to one embodiment of the invention, a determination is made as to whether the CPU supports 32-bit or 36-bit operation. According to one embodiment, this determination may be made by executing a CPUID instruction and examining the results of the instruction to determine whether the processor supports 36-bit addressing.

If the CPU supports 36-bit addressing a page directory is created containing entries that support accessing the memory according to a maximum page size supported by the processor. According to one embodiment the page size is four megabytes. Once the page directory has been created, it may be utilized to access and test a portion of the memory. The age directory may then be dynamically modified to allow access to other portions of the main memory.

If the processor supports 32-bit memory addressing, a page directory and one or more page tables are created for accessing the memory according to a maximum page size supported by the processor. According to one embodiment the page size is four kilobytes. Once the page directory and page tables have been created, they may be utilized to access and test a portion of the memory. The page directory and page tables may then be dynamically modified to allow access to other portions of the memory.

According to another embodiment of the present invention, one or more test parameters may be received. The test parameters may be received from a user or another application program. The test parameters identify one or more tests to be performed on the memory of a computer system. The test parameters may also identify a particular portion of the memory to be tested.

After the test parameters have been received, a determination may be made as to whether the computer system is executing a memory manager application. If a memory manager application is present, a backup area may be allocated within the memory for storing the contents of an area of memory while it is being tested. If no memory manager is present, a backup area is not created.

A first block of the area of memory to be tested is then identified as a current block of memory. A memory test is then performed on the current block of memory that is capable of testing memory located within the entire address space of a CPU supporting 32-bit memory addressing and the entire address space of a CPU supporting 36-bit memory addressing. This allows a 64 GB address space to be tested on a CPU supporting 36-bit addressing and a 4 GB address space to be tested on a CPU supporting 32-bit addressing.

According to one embodiment of the invention, the memory test is performed by first determining whether the CPU supports 32-bit or 36-bit addressing of the memory. If the CPU supports 36-bit addressing, a page directory containing entries for accessing a portion of the memory including the current block in four megabyte pages is dynamically created. If the CPU supports 32-bit addressing, a page directory and a page table are created containing entries for accessing a portion of the memory including the current block in four kilobyte pages.

Once the page directory and, if necessary, page tables have been created, the mode of operation for the CPU is changed from a real mode to a paging enabled protected mode. The contents of the current block of memory are then saved to the backup area if a memory manager is present and the block of memory is located in an area accessible by the memory manager. The memory test is then performed on the current block as specified by the test parameters. Any errors generated by the test are logged.

Once the test of the current block has completed, the contents of the current block of memory are restored by copying the contents of the backup area to the current block if a memory manager is present. The mode of operation for the CPU may then be returned to a real mode of operation and any errors generated may be reported.

According to one embodiment of the invention, a determination may be made as to whether additional blocks of memory identified in the test parameters remain to be tested. If additional blocks of memory remain to be tested, one of the remaining blocks is identified as a current block. The page directory and page tables are then dynamically modified to provide access to the new current block. The memory test is then performed on the current block. This process may then repeat until all blocks of memory identified in the test parameters have been tested.

According to one embodiment of the invention, interrupts are disabled within the computer prior to performing the memory test. This may include disabling system management interrupts. Additionally, the operation of input/output controllers, such as a Universal Serial Bus ("USB") host controller, may also be disabled prior to performing the memory test. Interrupts and input/output controllers may be enabled once the memory test has completed for each block.

A computer-readable medium and computer-controlled apparatus are also provided for testing memory in a computer utilizing a CPU capable of addressing memory using 32-bits or a CPU capable of addressing memory using 36-bits. Additional details regarding the various embodiments of the present invention will become apparent from the Detailed Description that follows.

DETAILED DESCRIPTION OF AN ILLUSTRATIVE EMBODIMENT

As described briefly above, embodiments of the present invention provide a method and system for testing memory in a computer utilizing either a CPU supporting 32-bit memory addressing or a CPU supporting 36-bit memory addressing. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined only by the appended claims and their equivalents.

Figure 1:
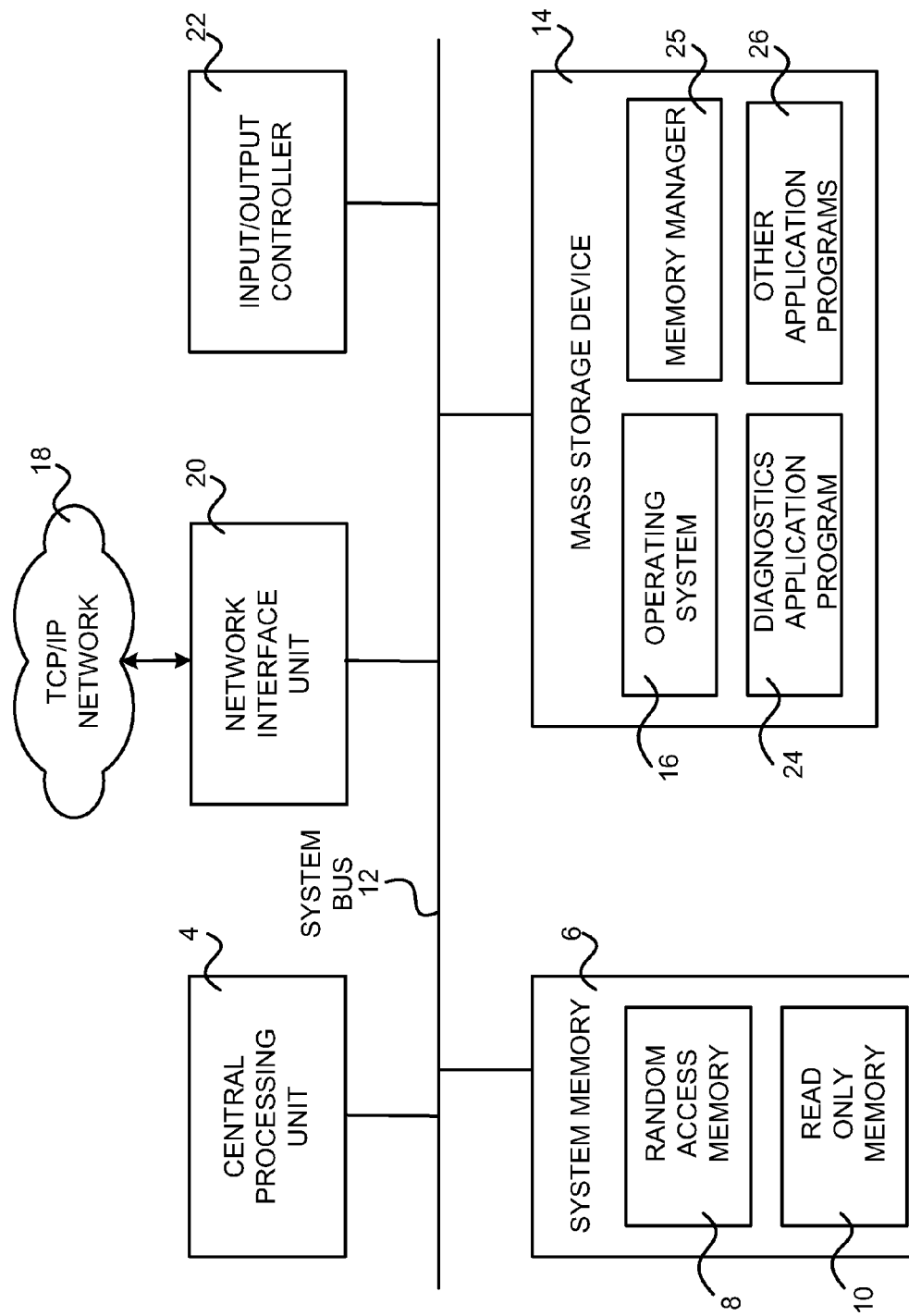
FIG. 1 is a block diagram showing an illustrative architecture for a computer utilized to practice various embodiments of the present invention.

Turning now to FIG. 1, an illustrative computer architecture for a computer 2 for practicing the various embodiments of the invention will be described. The computer architecture shown in FIG. 1 illustrates a conventional computer system, including a central processing unit 4 ("CPU"), a system, memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, programs, such as a diagnostics application program 24, a memory manager 25, and other applications programs 26, and data.

The mass storage device 14 is connected to the CPU 4 through a mass storage controller (not shown) connected to the bus 12. The mass storage device 14 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 2 may operate in a networked environment using logical connections to remote computers through a TCP/IP network 18, such as the Internet. The computer 2 may connect to the TCP/IP network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the computer 2, including an operating system 16 suitable for controlling the operation of the computer 2, such as the MS-DOS operating system from MICROSOFT CORPORATION of Redmond, Wash. Other types of suitable operating systems may also be utilized. The mass storage device 14 and RAM 8 may also store one or more executable programs. In particular, the mass storage device 14 and RAM 8 may store a diagnostics application program 24.

The diagnostics application program 24 is an executable program for performing tests on the computer 2 and diagnosing failures and potential failures within the various systems of the computer 2. The diagnostics application program 24 may perform tests on the mass storage device 14, the system memory 6, the network interface unit 20, and other components of the computer 2. According to the various embodiments of the invention provided herein, the diagnostics application program 2 is operative to perform a test on the RAM 8, also referred to as main memory herein, to determine if the RAM 8 is operating correctly. Additional details regarding the operation of the diagnostics application program 24 according to the various embodiments provided herein will be provided below with respect to FIGS. 3-9D.

According to various embodiments of the present invention, the mass storage device 14 and RAM 8 may also store a memory manager 25. As will be described in greater detail below, the memory manager 25 provides access to portions of the RAM 8 that would either be otherwise inaccessible or difficult to access without the use of the memory manager 25. According to one embodiment of the present invention, the memory manager 25 comprises the HIMEM.SYS memory manager known to those skilled in the art. Additional details regarding the operation and function of the memory manager 25 will be provided below with respect to FIG. 2.

Figure 2:
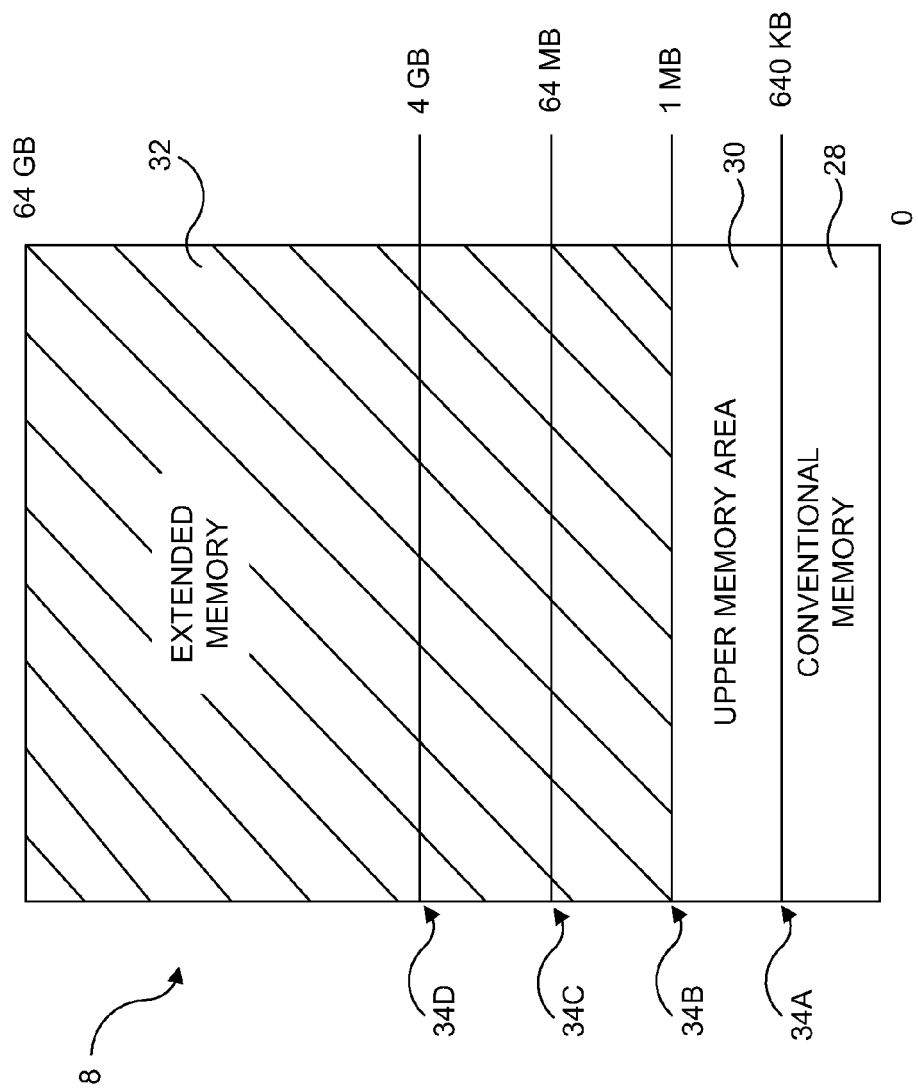
FIG. 2 is a block diagram illustrating a conventional memory architecture for a computer utilized in various embodiments of the present invention.

Prior to discussing in detail the various embodiments of the present invention, aspects of conventional memory architecture and memory addressing schemes used by many conventional 32-bit CPUs will be described. In particular, FIG. 2 shows a conventional memory architecture for a computer 2 utilized in various embodiments of the present invention. As shown in FIG. 2, the RAM 8 of the computer 2 is subdivided into several sections. In particular, the RAM 8 located from the base of memory to 640 KB is called conventional memory 28. Conventional memory 28 was traditionally the only memory available to non 32-bit operating systems such as the MS-DOS operating system ("DOS") from MICROSOFT CORPORATION.

Conventional memory 28 may contain device drivers, conventional variables, the DOS command processor, terminate-and-stay-resident ("TSR") application programs, conventional application programs, data, and other information. As known to those skilled in the art, the capabilities of DOS were later extended to include the use of the additional 384 KB between the 640 KB boundary 34A and the 1 MB boundary 34B. This area is called the upper memory area 30. In many systems, the ROM BIOS, device controller ROM, and video controller ROM and RAM are mirrored into this area.

Using a memory manager within DOS allows further access to the memory area between the 1 MB boundary 34B and the 64 MB boundary 34C. This area may be accessed using a memory manager such as HIMEM.SYS as known to those skilled in the art. The memory area between the 64 MB boundary 34C and the 4 GB boundary 34D is typically inaccessible within DOS. However, systems using processors with 32-bit addressing may address up to 4 GB of memory in a protected mode of operation. 32-bit operating systems such as the MICROSOFT WINDOWS family of operating systems can directly access this memory. Similarly, systems using processors with 36-bit addressing may address up to 64 GB of memory. However, the area of memory between 4 GB and 64 GB is typically inaccessible without the use of custom drivers. The area of memory between 1 MB and 64 GB is typically referred to as extended memory 32.

Figure 3:
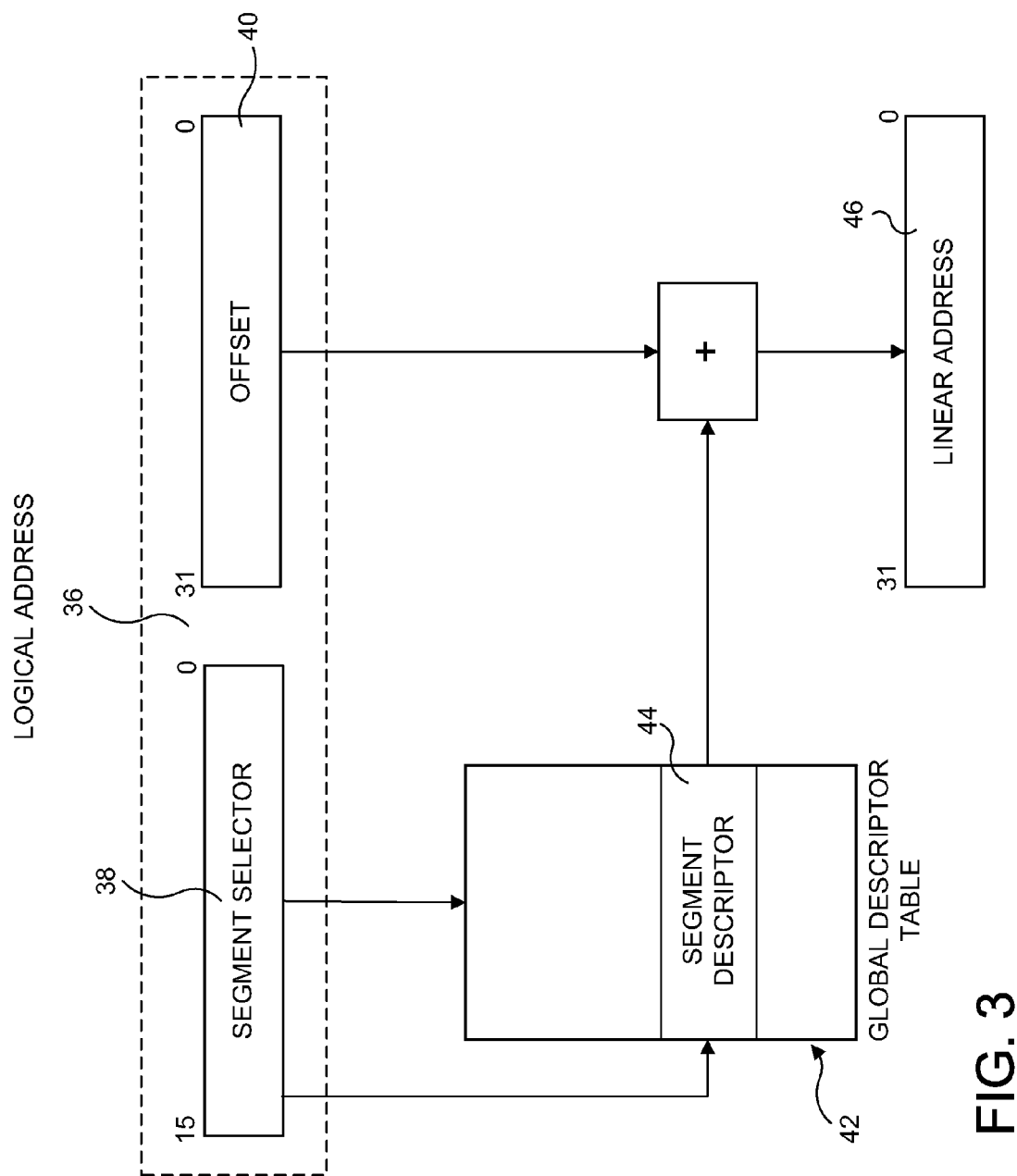
FIG. 3 is a block diagram illustrating a portion of a processor architecture for computing a linear memory address according to one embodiment of the invention.

In many modem CPUs, at least two stages of address translation are used to arrive at a physical address: logical-address translation and linear address space paging. FIG. 3 illustrates various aspects of a memory addressing scheme utilized by an assortment of modem CPUs for logical-address translation. Several schemes for performing paging will also be described below with respect to FIGS. 4 and 5.

FIG. 3 shows a portion of a processor architecture that computes a linear memory address 46 from a logical memory address 36. According to many typical processor architectures, each byte within a processor's address space is accessed with a logical address 36. A logical address 36 consists of a 16-bit segment selector 38 and a 32-bit offset 40. The segment selector 38 identifies the segment the byte is located in and the offset 40 specifies the location of the byte in the segment relative to the base address of the segment.

FIG. 3 shows how a conventional processor translates each logical address 36 into a linear address 46. The linear address space is a flat, unsegmented address space with addresses ranging from zero to the limit of the processor's address range. To translate a logical address 36 into a linear address 46, the processor uses the segment selector 38 to locate a segment descriptor 44 for the segment in the global descriptor table 42. The global descriptor table 42 contains the segment descriptors 44 that provide the processor with the size and location of each segment, as well as access control and status information. In the embodiments of the invention described herein, the global descriptor table 42 is created statically at compile time and is not modified.

Once the processor has identified the desired segment descriptor 44, it examines the segment descriptor 44 to check the access rights and range of the segment to insure that the segment is accessible and that the offset 40 is within the range of the segment. If the access rights and range are valid, the processor adds a base address for the segment located within the segment descriptor 44 to the offset 40 to form the linear address 46. As will be described in greater detail below with respect to FIGS. 4 and 5, the linear address 46 may then be utilized to locate a page within either physical or virtual memory containing the desired byte.

Figure 4:
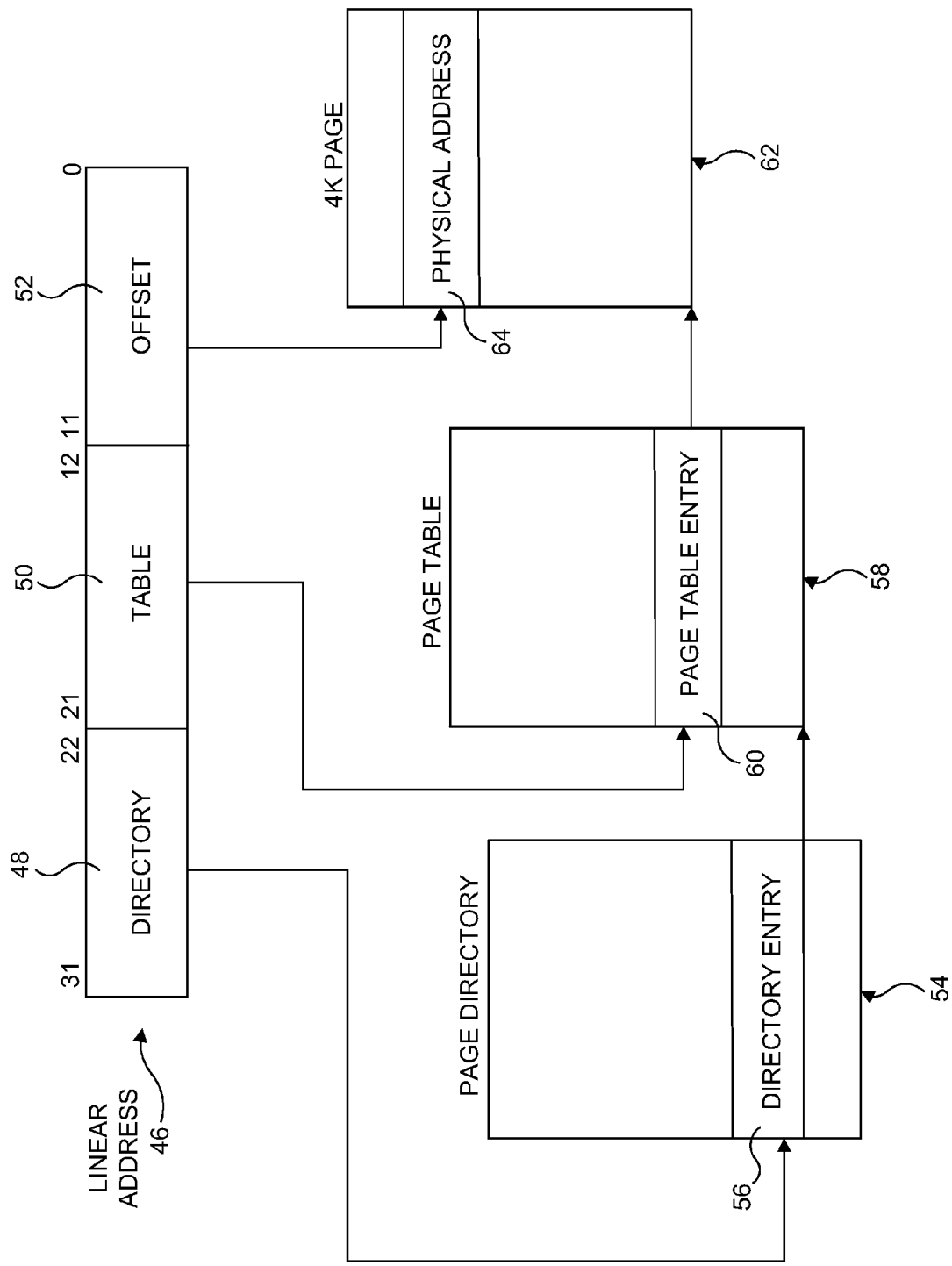
FIG. 4 is a block diagram illustrating a portion of a processor architecture for accessing memory pages in a main memory utilized by a CPU supporting 32-bit memory addressing.

Referring now to FIG. 4, aspects of a processor architecture for accessing memory pages in a main memory utilized by a CPU supporting 32-bit memory addressing will be described. As known to those skilled in the art, paging provides a mechanism where sections of a program's execution environment are mapped into physical memory as needed. Paging supports a "virtual memory" environment where a large linear address space is simulated with a small amount of physical memory (RAM and ROM) and some disk storage.

When using paging, each segment is divided into pages, which are stored in either physical memory or on the disk. In order to access the pages, the operating system or executive maintains a page directory and potentially a set of page tables to translate the linear address into a physical address and then performs the requested operation on the memory location. FIG. 4 illustrates this process when 32-bit memory addressing is utilized to access 4 KB pages of memory. It should be appreciated that the maximum amount of memory that may be addressed using this scheme is 4 GB.

As shown in FIG. 4, the linear address 46 is divided into several component parts in order to access a particular 4 KB page 62. In particular, bits 22-32 (48) of the linear address 46 provide an offset into a directory entry 56 in the page directory 54. The directory entry 56, in turn, provides the base physical address of a page table 58. Bits 12-21 of the linear address 46 (50) provide an offset to an entry in the selected page table 58, thereby identifying a page table entry 60. The page table entry 60 provides the base physical address of a page 62 in physical memory. Bits 0-11 (52) of the linear address 46 may then be used as an offset within the page 62 to identify the desired physical address 64.

As will be described in greater detail below, according to various embodiments of the present invention, a page directory 54 and one or more page tables 60 are created that provide access to pages of memory located anywhere within the entire address space of a processor utilizing 32-bit addressing. The page directory 54 and page tables 60 may also be dynamically modified at runtime to provide access to various portions of the memory, thereby allowing the entire memory to be tested. Additional details regarding an actual page directory and actual page tables utilized according to various embodiments of the present invention will be described below with respect to FIG. 6.

Figure 5:
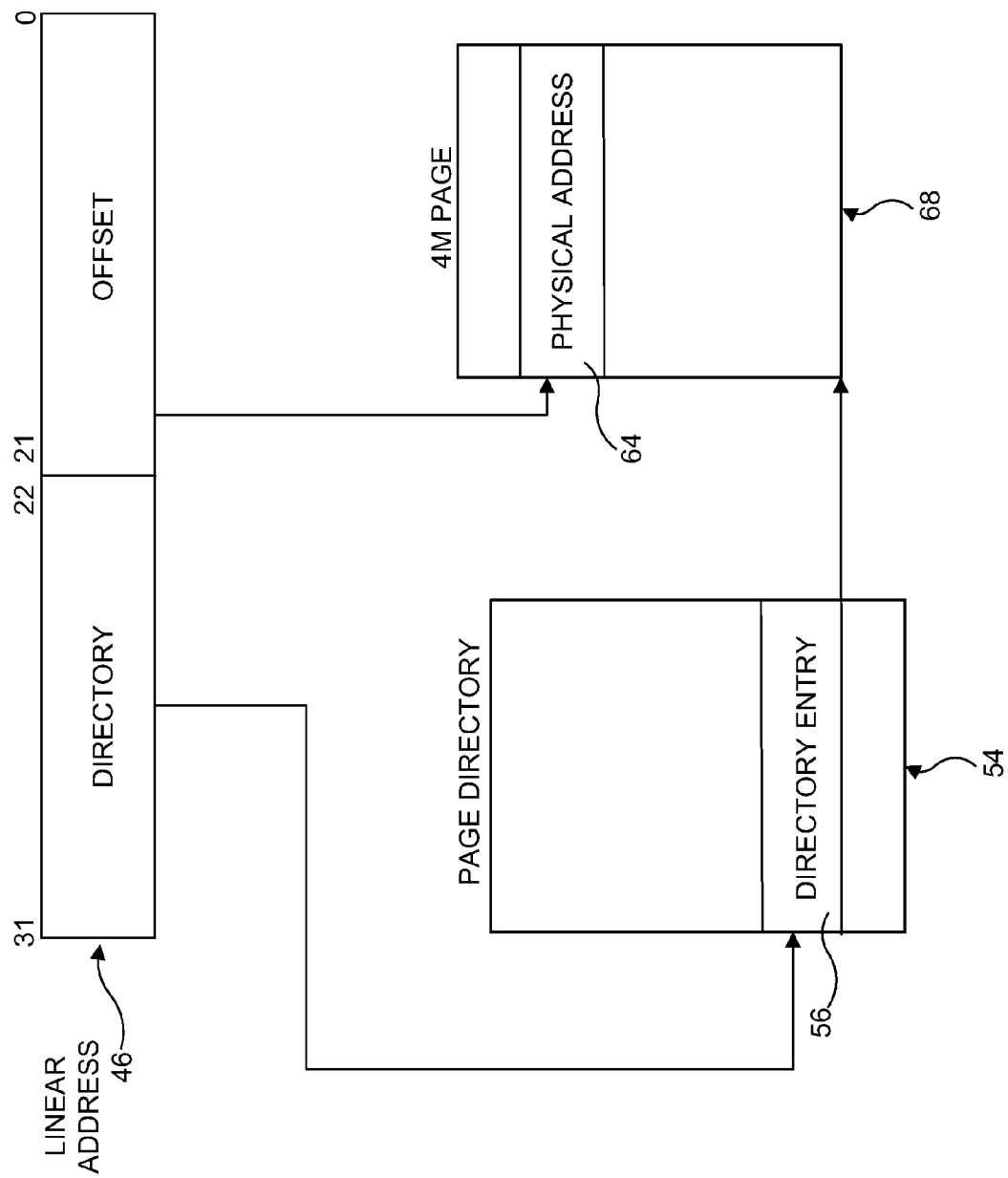
FIG. 5 is a block diagram illustrating a portion of a processor architecture for accessing memory pages in a main memory utilized by a CPU supporting 36-bit memory addressing.

Referring now to FIG. 5, aspects of a processor architecture for accessing memory pages in a main memory utilized by a CPU supporting 36-bit memory addressing will be described. As known to those skilled in the art, certain CPUs, such as the PENTIUM and ATHLON class of CPUs from INTEL CORPORATION and ADVANCED MICRO DEVICES, respectively, support a mode of operation that extends the number of bits used to access physical memory from 32 to 36. With respect to the PENTIUM class of processors, one such mechanism is the "PSE-36" paging mechanism which utilizes a page size extension ("PSE") mode and a modified page-directory table to map 4 MB pages into a 64 GB physical address space. The processor provides four additional address pins to accommodate the additional address bits. In the PENTIUM class of processors, the availability of PSE-36 paging is indicated with the PSE-36 feature bit (bit 17 of the EDX register when the CPUID instruction is executed with a source operand of one). When the PSE-36 paging mechanism is enabled, one page size is supported. Other processors such as the ATHLON also support 36-bit addressing and utilize similar methods for determining whether a 36-bit memory addressing mode is supported.

FIG. 5 shows how a 32-bit linear address 46 is mapped to a 36-bit physical address. In particular, the linear address 46 is mapped into only two sections. Bits 22-31 of the linear address 46 provide an offset to a directory entry 56 in the page directory 54. The selected page directory entry 56 provides the 14 most significant bits of a 36-bit address, which locates the base physical address of a 4 MB page 68. Bits 0-21 of the linear address 46 provide an offset to a physical address 64 in the selected page 68. This paging method can be used to map up to 1024 pages into a 64 GB physical space.

As will be described in greater detail below, according to various embodiments of the present invention, a page directory 54 and one or more page tables 58 are created that provide access to pages of memory located anywhere within the entire address space of a processor utilizing 36-bit addressing. The page directory 54 and page tables 58 may also be dynamically modified at runtime to provide access to various portions of the memory, thereby allowing the entire memory to be tested. Additional details regarding an actual page directory utilized according to various embodiments of the present invention will be described below with respect to FIG. 6.

Figure 6:
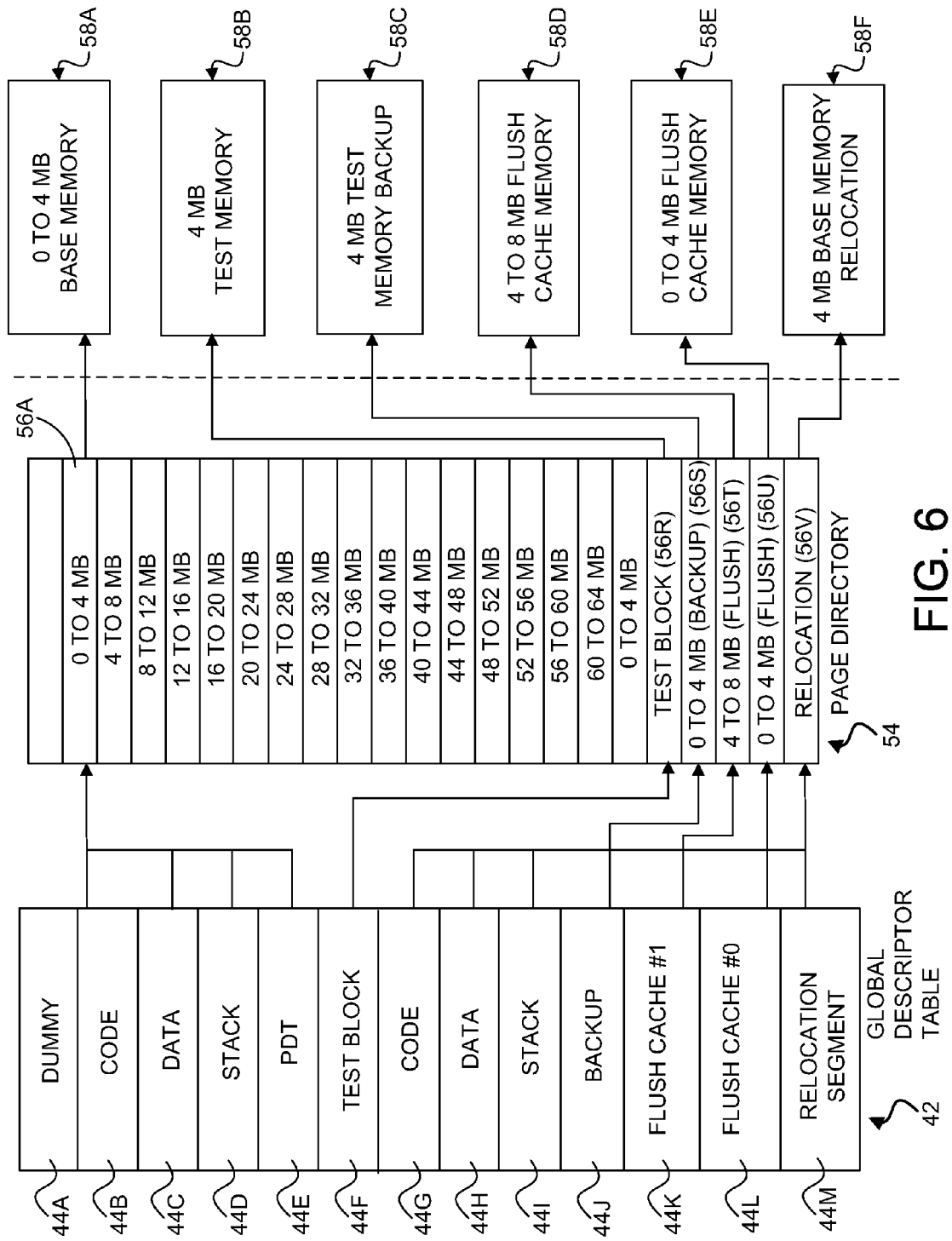
FIG. 6 is a block diagram illustrating an architecture for accessing a main memory utilized by a CPU supporting 32-bit memory addressing or a main memory utilized by a CPU supporting 36-bit memory addressing.

Referring now to FIG. 6, aspects of a computer architecture for accessing memory pages in a main memory utilized by a CPU supporting either 32-bit or 36-bit memory addressing will be described. As discussed briefly above, embodiments of the invention provide a unified method for testing the complete memory range of computer systems utilizing either processors with a 32-bit address bus or processors with a 36-bit address bus. In order to provide a single computer program capable of testing memory utilized by both types of processors, embodiments of the present invention utilize a page directory 54 configured for accessing memory in 4 MB pages to access memory when a 36-bit processor is utilized. When a 32-bit processor is utilized, embodiments of the present invention utilize a page directory 54 and one or more page tables 58A-58F to access memory in 4 KB pages. Both the page directory 54 and the page tables 58A-58F are dynamically updated to page through the entire portion of memory to be tested.

As shown in FIG. 6, a global descriptor table 42 is utilized that includes segment descriptors 44A-44M pointing into the page directory 54. In particular, a segment descriptor 44F is created that points to a directory entry 56R in the page directory 54 corresponding to the current block of memory being tested. As will be described in greater detail below, the directory entry 56R is dynamically modified during program execution to point to the page or page table for the memory block being currently tested. A segment descriptor 44J is also provided that points to a directory entry 56S for saving a backup of the block of memory currently being tested. Segment descriptors 44K and 44L are also provided pointing to entries in the page directory 54 utilized to flush the processor cache. A segment descriptor 44M is further provided pointing to an entry in the page directory 54 for relocating base memory.

As also shown in FIG. 6, when 36-bit addressing is utilized, the page directory 54 is configured to directly access 4 MB pages of an entire 64 GB memory range. When only 32-bits are utilized for memory addressing, however, the page tables 58A-58F are utilized to access any portion of a 4 GB address range using 4 KB pages. Entries in the page directory 54 and the page tables 58A-58F are dynamically modified during execution to address a desired memory location. Additional details regarding this process are described below with respect to FIGS. 9A-9D.

Figure 7:
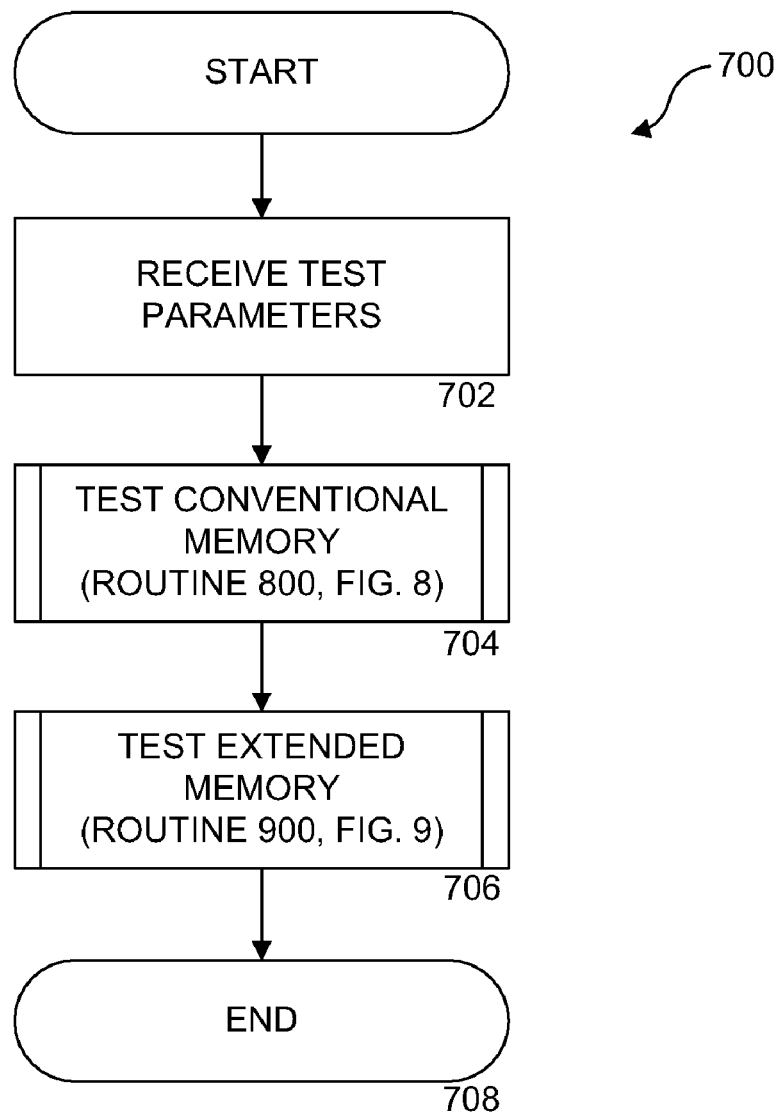
FIG. 7 is a flow diagram showing an illustrative routine for testing a main memory according to one actual embodiment of the present invention.

Referring now to FIG. 7, an illustrative routine 700 for testing a main memory according to one actual embodiment of the present invention will be described. As shown in FIG. 7, the routine 700 begins at block 702 where test parameters are received. Test parameters are typically received from a user. However, they may also be received from other application programs. Test parameters identify the portion of main memory to be tested and the identity of one or more pattern tests to be performed on the memory. As known to those skilled in the art, memory testing may include writing a bit pattern to the memory and reading the contents of the memory. If the pattern read is identical to the pattern written, the memory is operating properly. If, however, the read pattern is different than the written pattern, then the memory may be operating incorrectly. Therefore, a user or application program may specify one or more pattern or subpattern tests to be performed on the memory. The test parameters may also identify other aspects of the tests to be performed.

From block 702, the routine 700 continues to block 704 where conventional memory is tested. As described above, conventional memory comprises the area between the base of memory and 640 KB. An illustrative routine is described below with respect to FIG. 8 for testing the memory located in this region. Once the conventional memory has been tested, the routine 700 continues to block 706 where extended memory is tested. As described above, extended memory is the area of memory between 1 MB and 64 GB. An illustrative routine for testing extended memory is described below with respect to FIG. 9. Once the memory test has completed, the routine 700 continues to block 708, where it ends.

Figure 8:
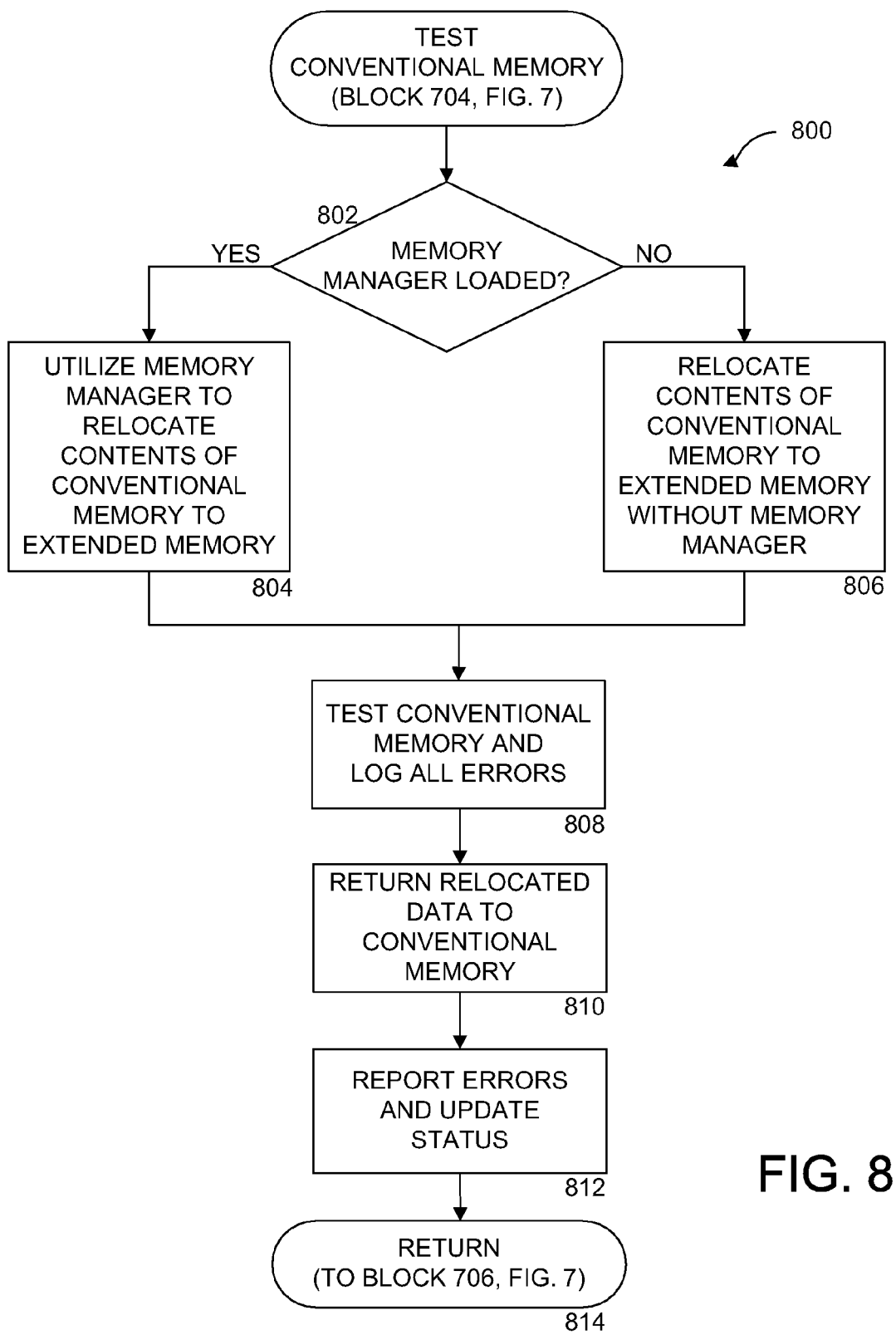
FIG. 8 is a flow diagram showing an illustrative routine for testing the conventional memory portion of a main memory according to one embodiment of the present invention.
Figure 9A:
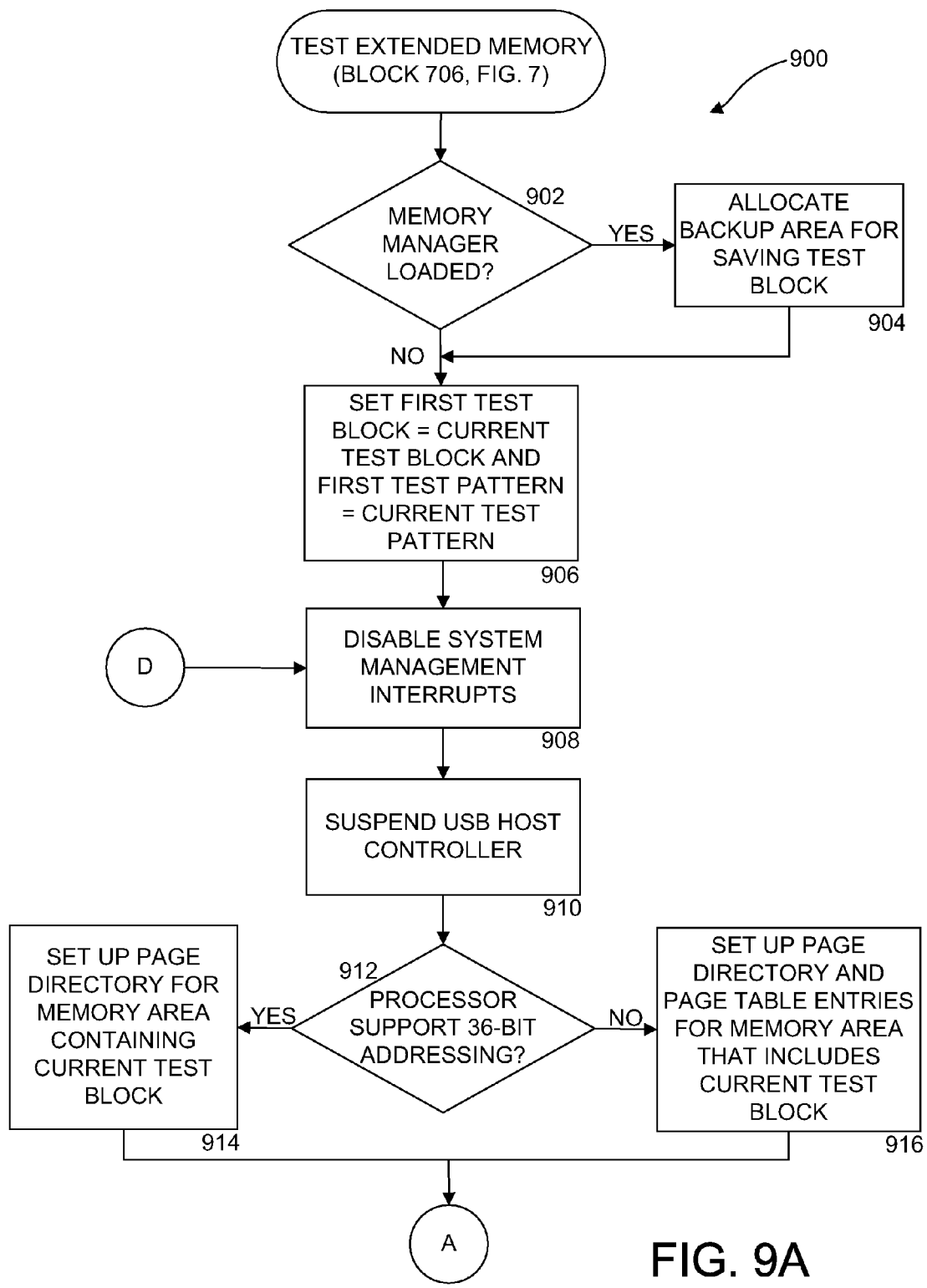
FIGS. 9A-9D are flow diagrams showing an illustrative routine for testing the extended memory portion of a main memory according to one actual embodiment of the present invention.
Figure 9B:
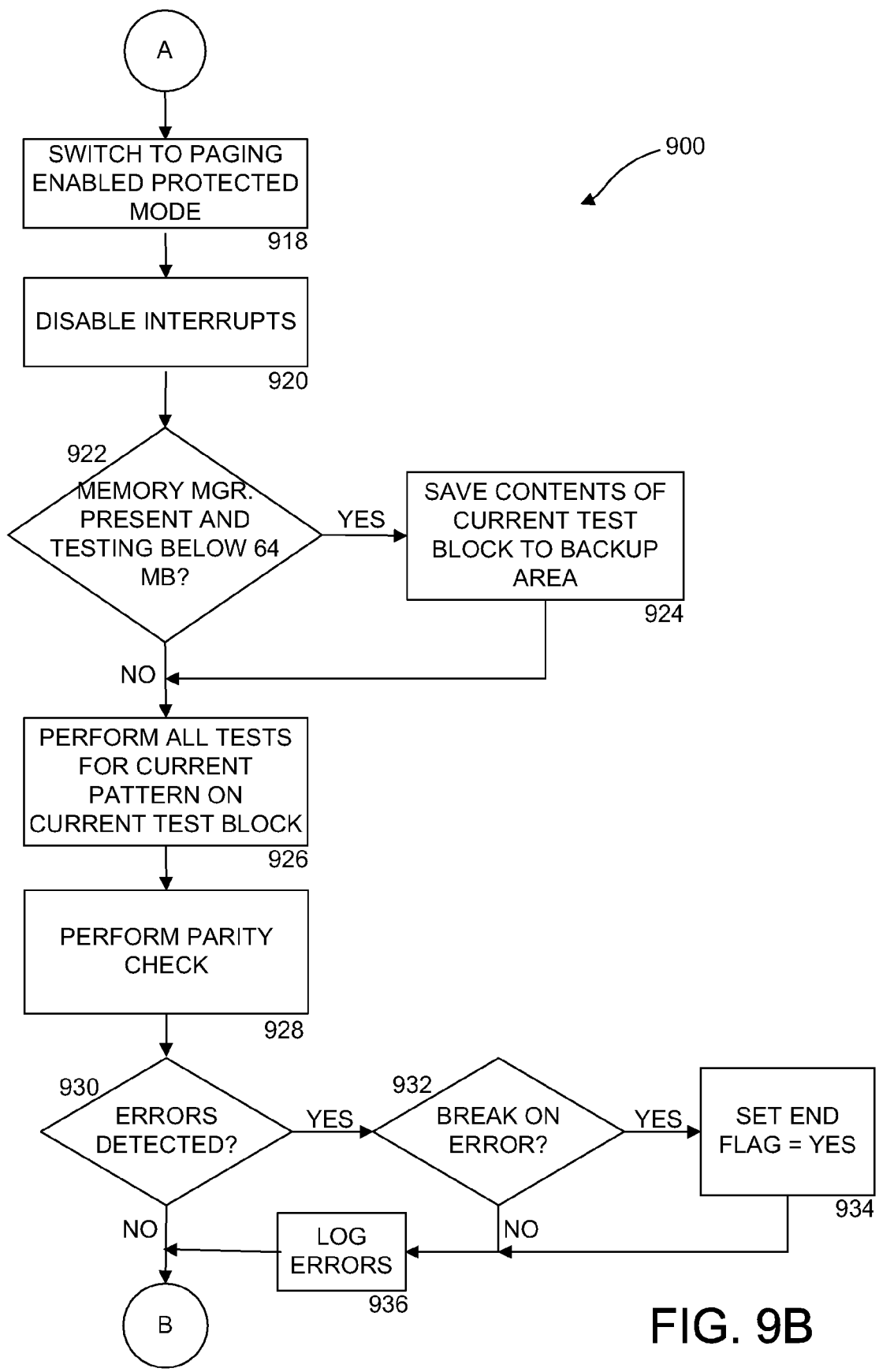
Figure 9C:
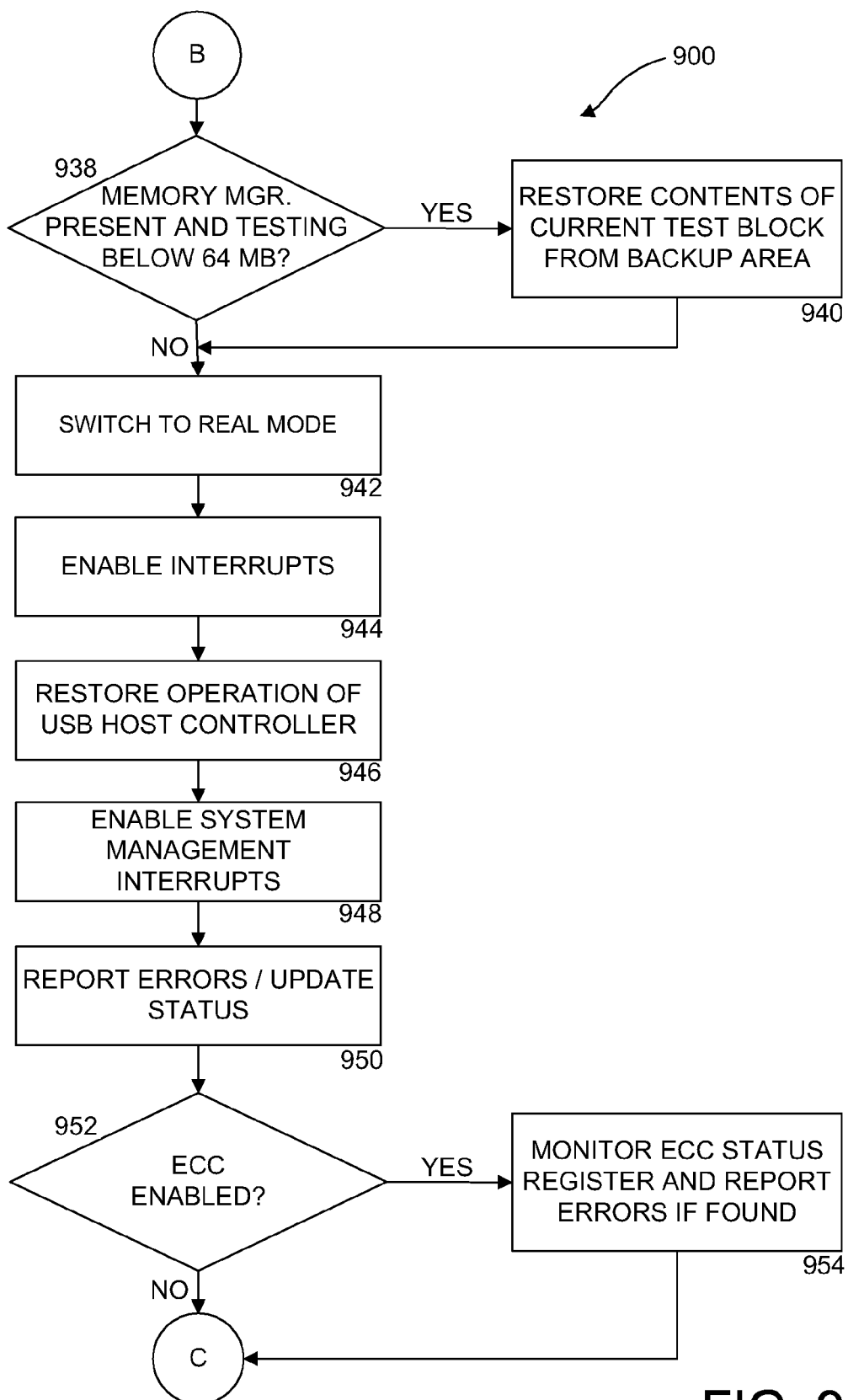
Figure 9D:
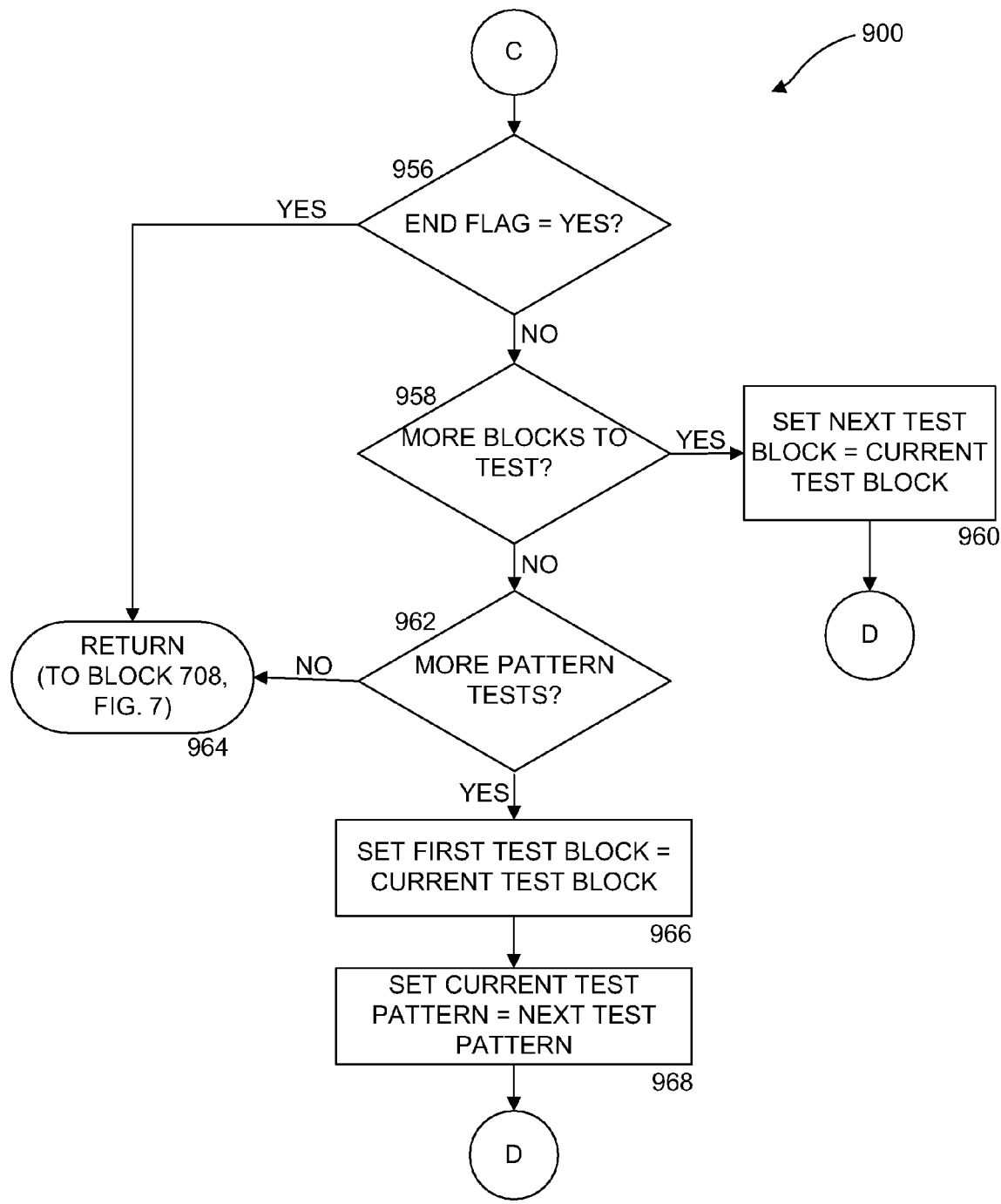

Turning now to FIG. 8, an illustrative routine 800 will be described for testing the contents of conventional memory. The routine 800 begins at block 802, where a determination is made as to whether a memory manager has been loaded on the computer 2 and is in use. If a memory manager is loaded, the routine 800 branches to block 804 where the memory manager is utilized to relocate the contents of conventional memory to extended memory. If, however, it is determined at block 802 that no memory manager is loaded, the routine 800 branches to block 806, where the contents of conventional memory are relocated to extended memory without the use of a memory manager. As will be described in greater detail below, the contents of conventional memory are restored once the memory test has completed.

From blocks 804 and 806, the routine 800 continues to block 808. At block 808, the conventional memory is tested by performing the pattern tests identified in the test parameters on conventional memory. During the test, all memory errors encountered are logged. These errors may be later displayed to a user or provided to a calling application program. The routine 800 then continues from block 808 to block 810.

At block 810, the contents of conventional memory are restored by copying the relocated data from extended memory back to conventional memory. In this manner, the contents of conventional memory are returned to the exact state they were in prior to the memory tests. The routine 800 then continues to block 812, where any encountered errors are reported and any status displays associated with the memory tests are updated. From block 812, the routine 800 continues to block 814, where it returns to block 706.

Turning now to FIGS. 9A-9D, an illustrative routine 900 will be described for testing the extended memory area between 1 MB and 64 GB. The routine 900 begins at block 902, where a determination is made as to whether a memory manager is loaded. If a memory manager is loaded, the memory manager may be utilized to allocate a backup area for saving the contents of the test block. The memory manager may then be utilized after the test has completed to restore the contents of the test area. Therefore, if a memory manager has been loaded, the routine 900 branches to block 904, where a backup area is allocated for saving the contents of the test block. The routine 900 then continues from block 904 to block 906.

If, at block 902, it is determined that no memory manager has been loaded, the routine continues from block 902 to block 906. At block 906, the first block of the area of memory to be tested is identified as the current test block. Additionally, the first test pattern to be performed on the memory is identified as the current test pattern. The current test block and current test pattern identify the current area of memory being tested and the current test being performed on that memory area, respectively. From block 906, the routine 900 continues to block 908.

At block 908, system management interrupts are disabled. As known to those skilled in the art, system management interrupts are generated to the processor in response to the occurrence of various system events. By disabling system management interrupts, the processor will not be interrupted as a result of system management events during the actual memory tests. At block 910 operation of any USB host controller within the computer 2 is also suspended for a similar purpose. The operation of other types of input/output devices may also be suspended at this time.

From block 910, the routine 900 continues to block 912 where a determination is made as to whether the processor supports 36-bit memory addressing. As described above with respect to FIG. 5, this may be accomplished by executing a CPUID instruction on the processor and examining the results. If it is determined that the processor supports 36-bit addressing, the routine 900 branches from block 912 to block 914. At block 914, the page directory 54 is generated for accessing the memory area containing the current test block in a 4 MB page. If, however at block 912, it is determined that the processor does not support 36-bit addressing, the routine 900 branches to block 916 where the page directory 54 and one or more page tables 60 are created for accessing the memory area including the current test block in 4 KB pages. From blocks 914 and 916, the routine 900 continues to block 918.

At block 918, the processor is switched from a real mode of operation to a paging enabled protected mode. As known to those skilled in the art, the paging enabled protected mode allows the processor to access the extended memory and perform other functions not otherwise available in the real mode. From block 918, the routine 900 continues to block 920, where all interrupts to the processor are disabled. From block 920, the routine continues to block 922.

At block 922, a determination is made as to whether a memory manager is present and executing on the computer 2 and whether testing is currently within a memory region below 64 MB. If a memory manager is present and testing is below 64 MB, the routine 900 branches to block 924. At block 924, the contents of the current test block are saved to the backup area allocated at block 904. The routine then continues from block 925 to block 926.

If, at block 922, it is determined that no memory manager is present or memory is being tested that is located beyond 64 MB, the routine 900 continues from block 922 to block 926. At block 926, all subpattern tests for the current pattern test are performed on the current test block. Any memory errors encountered during the tests are recorded. The routine 900 then continues to block 928, where a parity check is performed on the memory. The routine 900 then continues from block 928 to block 930.

At block 930, a determination is made as to whether any errors were detected from the pattern tests or the parity check. If errors were detected, the routine 900 continues to block 932 where a determination is made as to whether the user or application program has indicated that testing should stop in the event an error is encountered. If testing should stop when an error is detected, the routine 900 branches from block 932 to block 934 where an "end" flag is set that indicates that the memory testing should not continue. From block 934, the routine 900 continues to block 936 where the encountered memory errors are logged. From blocks 936 and 930, the routine 900 continues to block 938.

At block 938, a determination is again made as to whether a memory manager is present and the current test block is below 64 MB. If a memory manager is present and the current test block is below 64 MB, the routine 900 branches to block 940, where the contents of the current test block are restored by copying the contents of the backup area. If, however, a memory manager is not present or testing is beyond 64 MB, the routine 900 continues from block 938 to block 942.

At block 942, the mode of operation for the processor is changed from a paging enabled protected mode back to the real mode of operation. The routine 900 then continues to block 944 where interrupts are enabled, to block 946, where operation of the USB host controller is resumed, and to block 948 where system management interrupts are enabled. The routine then continues to block 950, where any encountered errors are reported and the status of the test is updated. This may include writing a screen display that indicates the current status and progress of the memory test.

From block 950, the routine 900 continues to block 952 where a determination is made as to whether error correction code ("ECC") memory is enabled. As known to those skilled in the art, ECC memory codes and decodes the contents of memory in order to identify any errors. If ECC memory is enabled, the routine 900 branches to block 954 where the status of the ECC register is monitored and any ECC errors encountered are reported. The routine 900 then continues from block 952 and 954 to block 956.

At block 956, a determination is made as to whether the end flag was set at block 934 indicating that the memory testing should stop. If the flag was set, the routine 900 branches from block 956 to block 964, where it returns to block 708. If the flag was not set, the routine 900 continues from block 956 to block 958. At block 958, a determination is made as to whether more blocks of memory remain to be tested using the current test pattern. If additional blocks of memory remain to be tested, the routine 900 branches to block 960 where the next block of the range of test memory is set as the current test block. The routine 900 then branches from block 960 to block 908, where the above-described memory test is again executed.

If, at block 958, it is determined that no additional blocks of memory remain to be tested with the current test pattern, the routine 900 continues to block 962. At block 962, a determination is made as to whether additional pattern tests remain to be performed. As described above with reference to FIG. 7, the test parameters received may include the identities of one or more test patterns to be performed on the range of test memory. If no additional pattern tests remain to be performed, the routine 900 branches from block 962 to block 964. However, if additional pattern tests remain, the routine branches from block 962 to block 966 where the current test block is set equal to the first block of memory in the range of memory to be tested. The routine then continues from block 966 to block 968 where the current test pattern is set equal to the next test pattern to be utilized in the memory test. In this manner, the entire memory test is reset for the next test pattern. The routine 900 then continues from block 968 to block 908 where the memory test is again performed.

Based on the foregoing, it should be appreciated that embodiments of the invention provide a unified method for testing memory in a computer system utilizing a CPU with either a 32-bit or 36-bit memory addressing. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for testing a main memory of a computer having a central processing unit supporting either 32-bit or 36-bit memory addressing, the method comprising:

determining whether the central processing unit supports 32-bit or 36-bit addressing of the main memory;

in response to determining that the central processing unit supports 36-bit addressing, identifying a portion of the memory to be tested, creating a page directory containing entries for directly accessing the portion of the memory to be tested according to a maximum page size supported by the central processing unit, directly accessing the portion of the memory to be tested using the page directory, and testing the accessed memory portion; and in response to determining that the central processing unit supports 32-bit addressing, identifying a portion of the memory to be tested, dynamically creating a page directory and one or more page tables containing entries for accessing the portion of the memory to be tested according to a maximum page size supported by the central processing unit, accessing the portion of the memory to be tested using the page directory and the one or more page tables and testing the accessed memory portion.

2. The method of claim 1, wherein determining whether the central processing unit supports 32-bit or 36-bit addressing comprises executing a CPUID instruction and examining the results of the execution to determine whether the central processing unit supports 32-bit or 36-bit addressing.

3. The method of claim 1, wherein the maximum page size supported by the central processing unit supporting 36-bit addressing is four megabytes.

4. The method of claim 1, where the maximum page size supported by the central processing unit supporting 32-bit addressing is four kilobytes.

5. The method of claim 1, further comprising in response to determining that the central processing unit supports 36-bit addressing, dynamically modifying an entry in the page directory for directly accessing a second portion of the memory according to a maximum page size supported by the central processing unit, accessing the second portion of the memory using the modified page directory, and testing the accessed second memory portion.

6. The method of claim 1, further comprising in response to determining that the central processing unit supports 32-bit addressing, dynamically modifying the page directory and the one or more page tables for accessing a second portion of the memory according to a maximum page size supported by the central processing unit, accessing the second portion of the memory using the modified page directory and the one or more page tables, and testing the accessed second memory portion.

7. A computer-readable medium comprising instructions which, when executed by a computer, cause the computer to perform the method of claim 1.

8. A method for testing a main memory of a computer having a central processing unit supporting either 32-bit or 36-bit memory addressing, the method comprising:
   receiving one or more test parameters, the test parameters comprising the identity of one or more tests to be performed on the memory and a description of an area of the memory to be tested;
   determining whether the computer is executing a memory manager program, and allocating a backup area in the memory in response to determining that the computer is executing a memory manager;
   identifying a first block of the area of the memory to be tested as a current block; and
   performing a memory test on the current block according to the test parameters, the memory test capable of testing memory located within an entire address space of a central processing unit supporting 32-bit memory addressing using a page directory configured to point to one or more page tables for accessing the current block of memory to be tested and an entire address space of a central processing unit supporting 36-bit memory addressing using the page directory configured to directly access the current block of memory to be tested.

9. The method of claim 8, wherein performing the memory test comprises:
   determining whether the central processing unit supports 32-bit or 36-bit addressing of the main memory;
   in response to determining that the central processing unit supports 36-bit addressing, dynamically creating the page directory containing entries for accessing a portion of the memory that includes the current block in four megabyte pages;
   in response to determining that the central processing unit supports 32-bit addressing, dynamically creating the page directory and one or more page tables containing entries for accessing a portion of the memory that includes the current block in four kilobyte pages;
   changing an operational mode of the central processing unit from a real mode to a paging enabled protected mode;
   saving the contents of the current block of memory to the backup area if a memory manager is executing within the computer and the current block is located within an area of the memory accessible by the memory manager;
   performing the test identified by the test parameters on the current block of memory and logging any errors generated by the test; and
   restoring the contents of the current block of memory from the backup area if a memory manager is executing within the computer and the current block is located within an area of the memory accessible by the memory manager.

10. The method of claim 9, wherein performing the memory test further comprises:
    changing an operational mode of the central processing unit from a paging enabled protected mode to a real mode; and
    displaying any errors logged by the test.

11. The method of claim 10, wherein performing the memory test further comprises:
    disabling interrupts within the computer and disabling the operation of one or more input/output controllers within the computer prior to determining whether the central processing unit supports 32-bit or 36-bit addressing of the main memory; and
    enabling interrupts within the computer and enabling the operation of the one or more input/output controllers after changing an operational mode of the central processing unit from a paging enabled protected mode to a real mode.

12. The method of claim 11, further comprising:
    determining whether additional blocks of memory remain to be tested;
    in response to determining that additional blocks of memory remain to be tested, identifying a next block of memory as a current block, and performing the memory test on the current block.

13. A computer-readable medium comprising instructions which, when executed by a computer, cause the computer to perform the method of claim 8.

14. A computer-controlled apparatus having a processor and a memory, the memory having stored instructions which, when executed by the processor, cause the computer-controlled apparatus to perform the method of claim 8.

15. A computer-readable medium comprising computer-executable instructions stored thereon which, when executed by a computer, cause the computer to:
    determine whether a central processing unit of the computer supports 36-bit addressing of a main memory;
    if the central processing unit of the computer supports 36-bit addressing,
       create a page directory configured for accessing memory according to a maximum page size supported by the central processing unit,
       create a page directory entry within the page directory that points directly to a current memory page under test,
       access the current memory page using the page directory entry,
       test the current memory page, and
       modify the page directory entry to update the current memory page; and if the central processing unit of the computer does not support 36-bit addressing,
       create a page directory and a page table configured for accessing memory according to a maximum page size supported by the central processing unit, create a page table entry within the page table that points to a current memory page under test, access the current memory page using the page table entry, test the current memory page, and modify the page table entry to update the current memory page.

16. The computer-readable medium of claim 15, wherein causing the computer to determine whether the central processing unit of the computer supports 36-bit addressing of the main memory comprises causing the computer to execute a CPUID instruction and to examine the results of the execution to determine whether the central processing unit supports 32-bit or 36-bit addressing.

17. The computer-readable medium of claim 15, wherein the maximum page size supported by the central processing unit supporting 36-bit addressing is four megabytes.

18. The computer-readable medium of claim 15, wherein the maximum page size supported by the central processing unit not supporting 36-bit addressing is four kilobytes.

19. The computer-readable medium of claim 15, further comprising computer-executable instructions stored thereon which, when executed by a computer, cause the computer to:

receive one or more test parameters, the test parameters comprising the identity of one or more tests to be performed on the memory and a description of an area of the memory to be tested;

determine whether the computer is executing a memory manager program, and allocate a backup area in the memory in response to determining that the computer is executing a memory manager; and wherein causing the computer to test the current memory page comprises causing the computer to perform a memory test on the current memory page according to the test parameters.

20. The computer-readable medium of claim 15, further comprising computer-executable instructions stored thereon which, when executed by a computer, cause the computer to:

change an operational mode of the central processing unit from a real mode to a paging enabled protected mode prior to testing the current memory page;

save the contents of the current memory page to a backup area if a memory manager is executing within the computer and the current memory page is located within an area of the memory accessible by the memory manager;

disable interrupts within the computer and disable the operation of one or more input/output controllers within the computer prior to determining whether the central processing unit supports 36-bit addressing of the main memory;

change the operational mode of the central processing unit from the paging enabled protected mode to the real mode after testing the current memory page; and enable interrupts within the computer and enable the operation of the one or more input/output controllers after changing the operational mode of the central processing unit from the paging enabled protected mode to the real mode.

* * * * *